(12) United States Patent
Yoshida et al.

(10) Patent No.: US 10,599,501 B2
(45) Date of Patent: Mar. 24, 2020

(54) INFORMATION PROCESSING DEVICE, INFORMATION PROCESSING METHOD, AND RECORDING MEDIUM

(71) Applicant: NEC CORPORATION, Tokyo (JP)

(72) Inventors: Shinichiro Yoshida, Tokyo (JP); Kentarou Yabuki, Tokyo (JP); Kiyoshi Kato, Tokyo (JP); Hideo Hasegawa, Tokyo (JP); Hiroyuki Miyazaki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 128 days.

(21) Appl. No.: 15/557,865

(22) PCT Filed: Mar. 15, 2016

(86) PCT No.: PCT/JP2016/001467
§ 371 (c)(1),
(2) Date: Sep. 13, 2017

(87) PCT Pub. No.: WO2016/147657
PCT Pub. Date: Sep. 22, 2016

(65) Prior Publication Data
US 2018/0052726 A1    Feb. 22, 2018

(30) Foreign Application Priority Data
Mar. 17, 2015   (JP) .................... 2015-053606

(51) Int. Cl.
*G06F 11/07*    (2006.01)
*G06F 16/28*    (2019.01)
(Continued)

(52) U.S. Cl.
CPC .......... *G06F 11/07* (2013.01); *G05B 23/0221* (2013.01); *G05B 23/0254* (2013.01); *G06F 16/285* (2019.01); *G06F 16/353* (2019.01)

(58) Field of Classification Search
CPC .................................................. G06F 11/0751
(Continued)

(56) References Cited

U.S. PATENT DOCUMENTS

2013/0055037 A1*   2/2013   Nonogaki ........... G06F 11/3688
                                                                             714/48
2013/0232382 A1*   9/2013   Jain ...................... H04L 41/069
                                                                             714/48
(Continued)

FOREIGN PATENT DOCUMENTS

EP           3336636 A1 *   6/2018         G05B 23/0283
JP        2006-285825 A     10/2006
(Continued)

OTHER PUBLICATIONS

International Search Report of PCT/JP2016/001467 dated Jun. 14, 2016 [PCT/ISA/210].
(Continued)

*Primary Examiner* — Chae M Ko
(74) *Attorney, Agent, or Firm* — Sughrue Mion, PLLC

(57) ABSTRACT

Accuracy of risks defined for abnormalities that might occur in a system is improved. The risk determination device 100 includes a classification unit 114 and a determination unit 115. The classification unit 114 classifies abnormal patterns 133, each representing a relationship among metrics at a time of abnormality detection in a system, into groups 134 based on a similarity between the abnormal patterns. The determination unit 115 determines, based on the number of abnormal patterns 133 classified into each of the groups 134, likelihood of an abnormality of the corresponding group 134.

8 Claims, 17 Drawing Sheets

(51) Int. Cl.
  *G06F 16/35*  (2019.01)
  *G05B 23/02*  (2006.01)
(58) Field of Classification Search
  USPC .................................................. 714/25, 48
  See application file for complete search history.

(56) References Cited

U.S. PATENT DOCUMENTS

| | | | | |
|---|---|---|---|---|
| 2014/0172371 A1* | 6/2014 | Zhu | ................... | G06F 11/0709 |
| | | | | 702/185 |
| 2015/0219530 A1* | 8/2015 | Li | ................... | G05B 23/0243 |
| | | | | 702/181 |
| 2017/0116061 A1* | 4/2017 | Patra | ................... | G06F 11/079 |
| 2017/0235622 A1* | 8/2017 | Boyapalle | ........... | G06F 11/3055 |
| | | | | 714/47.2 |

FOREIGN PATENT DOCUMENTS

| | | |
|---|---|---|
| JP | 2008-252988 A | 10/2008 |
| JP | 4872944 B2 | 2/2012 |
| JP | 5375829 B2 | 12/2013 |
| JP | 5428372 B2 | 2/2014 |
| WO | 2008/149975 A1 | 12/2008 |
| WO | 2011/111599 A1 | 9/2011 |

OTHER PUBLICATIONS

Written Opinion of PCT/JP2016/001467 dated Jun. 14, 2016 [PCT/ISA/237].

* cited by examiner

Fig. 6

132 CORRELATION MODEL

| INPUT METRIC | OUTPUT METRIC | CORRELATION |
|---|---|---|
| METRIC 1 | METRIC 2 | $f_{1,2}$ |
| METRIC 1 | METRIC 3 | $f_{1,3}$ |
| METRIC 1 | METRIC 4 | $f_{1,4}$ |
| METRIC 1 | METRIC 5 | $f_{1,5}$ |
| METRIC 2 | METRIC 3 | $f_{2,3}$ |
| METRIC 2 | METRIC 4 | $f_{2,4}$ |
| METRIC 3 | METRIC 4 | $f_{3,4}$ |
| METRIC 4 | METRIC 5 | $f_{4,5}$ |

Fig. 9

NUMBER OF OCCURRENCES

| ABNORMALITY NAME | NUMBER OF OCCURRENCES | IMPACT (IMPACTING TIME [H]) | ADDITIONAL INFORMATION (CAUSE, COUNTERMEASURE, ETC.) | ABNORMAL PATTERN (REPRESENTATIVE PATTERN) $f_{1,2}\ f_{1,3}\ f_{1,4}\ f_{1,5}\ f_{2,3}\ f_{2,4}\ f_{3,4}\ f_{4,5}$ |
|---|---|---|---|---|
| PIPE BURST | 6 | 12 | PIPE REPLACEMENT | 11110000 |
| MOTOR FAILURE | 20 | 6 | WEAR | 00001111 |
| PIPE CLOGGING | 2 | 1 | PIPE CLEANING | 10101010 |

Fig. 10

| ABNORMALITY NAME | NUMBER OF OCCURRENCES (2 MONTHS) | LIKELIHOOD (FREQUENCY) [NUMBER OF OCCURRENCES/MONTH] |
|---|---|---|
| PIPE BURST | 6 | 3 |
| MOTOR FAILURE | 20 | 10 |
| PIPE CLOGGING | 2 | 1 |

Fig. 11

LIKELIHOOD CONVERSION TABLE

| LIKELIHOOD (FREQUENCY) ([NUMBER OF OCCURRENCES/MONTH]) | LIKELIHOOD LEVEL |
|---|---|
| 20 OR MORE | 5 |
| 10 TO 19 | 4 |
| 6 TO 9 | 3 |
| 2 TO 5 | 2 |
| 0 TO 1 | 1 |

IMPACT CONVERSION TABLE

| IMPACT (IMPACTING TIME [H]) | LIKELIHOOD LEVEL |
|---|---|
| 24 OR MORE | 5 |
| 12 TO 23 | 4 |
| 6 TO 11 | 3 |
| 2 TO 5 | 2 |
| 0 TO 1 | 1 |

135 RISK DETERMINATION RESULT

| ABNORMALITY NAME | LIKELIHOOD LEVEL | IMPACT LEVEL |
|---|---|---|
| PIPE BURST | 2 | 4 |
| MOTOR FAILURE | 4 | 3 |
| PIPE CLOGGING | 1 | 1 |

Fig. 15

NEW ABNORMALITY DETECTED

ABNORMALITY NAME: PIPE BURST
ADDITIONAL INFORMATION: PIPE REPLACEMENT
LIKELIHOOD (FREQUENCY): 1 TIME/MONTH

RISK OF THIS ABNORMALITY

| | | LIKELIHOOD LEVEL | | | | |
|---|---|---|---|---|---|---|
| | | 1 | 2 | 3 | 4 | 5 |
| IMPACT LEVEL | 5 | | | | | |
| | 4 | ● | | | | |
| | 3 | | | | | |
| | 2 | | | | | |
| | 1 | | | | | |

INFORMATION PROCESSING DEVICE, INFORMATION PROCESSING METHOD, AND RECORDING MEDIUM

CROSS REFERENCE TO RELATED APPLICATIONS

This application is a National Stage of International Application No. PCT/JP2016/001467, filed Mar. 15, 2016, claiming priority based on Japanese Patent Application No. 2015-053606, filed Mar. 17, 2015, the contents of all of which are incorporated herein by reference in their entirety.

TECHNICAL FIELD

The present invention relates to an information processing device, an information processing method, and a recording medium.

BACKGROUND ART

In maintenance of plant systems or IT (Information Technology) systems, a maintenance plan is drawn up based on a risk matrix that is generated by risk analysis of the system. The risk matrix is a matrix that represents a magnitude of a risk involved in each event, such as an accident or a failure of a system, with a likelihood level that indicates how likely the event is to occur and an impact level of the event. The risk matrix indicates combinations of likelihood and impacts for a variety of events that will possibly occur in a system. Accordingly, the maintenance is reinforced for events with greater magnitudes of risks (with greater levels of likelihood and impacts) by increasing the number of inspections for the events, for example.

In this way, to analyze risks in a system, it is necessary to classify events that will possibly occur and define likelihood and an impact for each classified event. A technique for analyzing a risk in a system is disclosed, for example, in PTL 1. The technique described in PTL 1 calculates an impact of an event described in risk items using risk analysis models that are created based on risk cases.

It is noted that, as a relevant technique, PTL 2 discloses a technique that determines a position on a risk assessment matrix corresponding to a current operation condition of equipment, and displays a guidance corresponding to the determined position. Further, PTL 3 discloses a technique that generates a system model using time-series performance information of a system, and monitors the system using the generated model. PTL 4 discloses a technique for detecting a system failure based on destruction of a correlation. PTL 5 discloses a technique for detecting system performance degradation based on destruction of a correlation.

CITATION LIST

Patent Literature

PTL 1: Japanese Patent Application Laid-open Publication No. 2006-285825
PTL 2: Japanese Patent Application Laid-open Publication No. 2008-252988
PTL 3: Japanese Patent No. 4872944
PTL 4: Japanese Patent No. 5375829
PTL 5: Japanese Patent No. 5428372

SUMMARY OF INVENTION

Technical Problem

In the technique of the above-described PTL 1, a description of an event relating to each risk item need to be input by a user based on user's knowledge or experiences. Likewise, likelihood (occurrence frequency) of an event need to be input by the user based on the user's knowledge or experiences. Thus, classification of events and likelihood of the events represented in the risk matrix depends on the expertise of the user inputting them, thereby lowering accuracy of defining risks.

For example, it is assumed that the same failure (phenomenon) in a plant system is caused by either long-term degradation of a pipe due to normal operation or short-term degradation of a pipe due to a reaction to a specific material, however, the likelihood and impact vary depending on the causes. In such a case, to design a maintenance plan according to a risk (the likelihood and impact) for each of the causes, it is desirable to set the likelihood and impact for each of the causes. However, a user is likely to set the likelihood and impact for the observed same phenomenon, based on the user's knowledge or experiences.

On the other hand, when different phenomena are caused by the same cause, it is desirable to set the likelihood and impact for the same cause. However, in such a case, a user is likely to set the likelihood and impact for each of the observed different phenomena, based on the user's knowledge or experiences.

An object of the present invention is to provide an information processing device, an information processing method, and a program that can solve the above problem and improve accuracy of risks defined for abnormalities that might occur in a system.

Solution to Problem

An information processing device according to an exemplary aspect of the present invention includes: a classification means for classifying abnormal patterns, each representing a relationship among metrics at a time of abnormality detection in a system, into groups based on a similarity between the abnormal patterns; and a determination means for determining, based on the number of abnormal patterns classified into each of the groups, likelihood of an abnormality of the corresponding group.

An information processing method according to an exemplary aspect of the present invention includes: classifying abnormal patterns, each representing a relationship among metrics at a time of abnormality detection in a system, into groups based on a similarity between the abnormal patterns; and determining, based on the number of abnormal patterns classified into each of the groups, likelihood of an abnormality of the corresponding group.

A computer readable storage medium according to an exemplary aspect of the present invention records thereon a program causing a computer to perform a method including: classifying abnormal patterns, each representing a relationship among metrics at a time of abnormality detection in a system, into groups based on a similarity between the abnormal patterns; and determining, based on the number of abnormal patterns classified into each of the groups, likelihood of an abnormality of the corresponding group.

Advantageous Effects of Invention

An advantageous effect of the present invention is improving accuracy of risks defined for abnormalities that might occur in a system.

BRIEF DESCRIPTION OF DRAWINGS

FIG. 6 is a diagram illustrating an example of a correlation model 132 according to the first example embodiment of the present invention;

FIG. 9 is a diagram illustrating an example of information stored in a group storage unit 124 according to the first example embodiment of the present invention;

FIG. 10 is a diagram illustrating an example of a likelihood calculation result according to the first example embodiment of the present invention;

FIG. 11 is a diagram illustrating an example of a likelihood conversion table and an impact conversion table according to the first example embodiment of the present invention;

FIG. 15 is a diagram illustrating an example of a determination result screen 137 according to the second example embodiment of the present invention;

DESCRIPTION OF EMBODIMENTS

First, risks in the example embodiments of the present invention will be described. In the example embodiments of the present invention, a magnitude of a risk of an event, such as an accident or a failure of a system, is represented by a combination of likelihood that indicates how likely the event is to occur and an impact of the event. Here, a probability or frequency of an event may be used as the likelihood of the event. Further, a consequence of an event may be used as an impact of the event.

First Example Embodiment

A first example embodiment of the present invention will be described.

Figure 2:
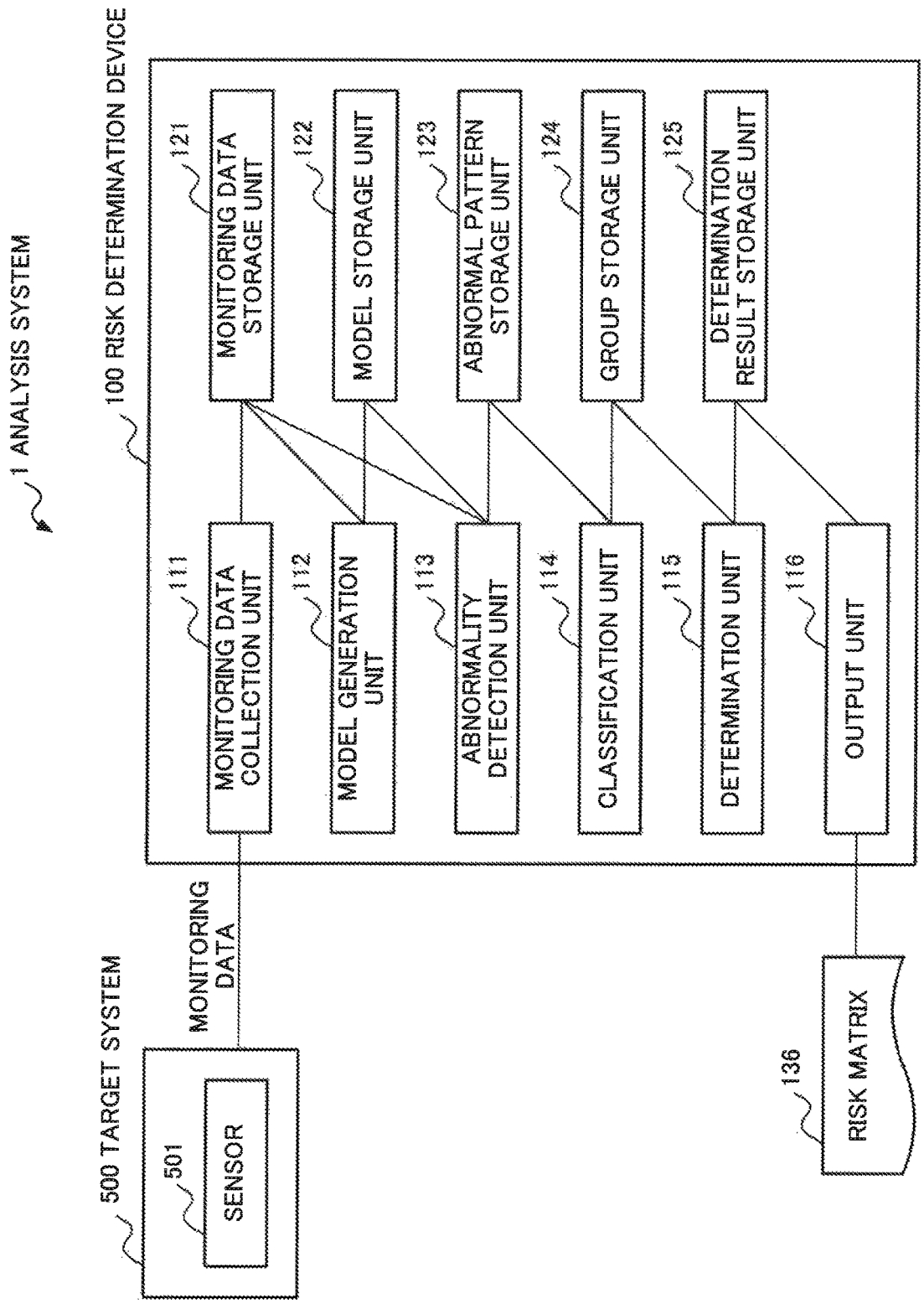
FIG. 2 is a block diagram illustrating a configuration of an analysis system 1 according to the first example embodiment of the present invention.

First, a configuration of the first example embodiment of the present invention will be described. FIG. 2 is a block diagram illustrating the configuration of an analysis system 1 according to the first example embodiment of the present invention.

Referring to FIG. 2, the analysis system 1 includes a risk determination device 100 and a target system 500 (or, simply, a system). The analysis system 1 is an example embodiment of the information processing system of the present invention. The risk determination device 100 is an example embodiment of the information processing device of the present invention.

The analysis system 1 is, for example, a plant system. In such a case, the target system 500 is a plant, such as a petroleum plant, a chemical plant, and a steel plant, that performs predetermined processing. Alternatively, the analysis system 1 may be an IT system. In such a case, the target system 500 consists of, for example, one or more computers.

The target system 500 includes sensors 501. The sensors 501 measure values of indexes (metrics) for a plurality of items, which are monitoring targets in the target system 500, with a regular interval. Here, the items of monitoring targets include, for example, power, voltage, current, temperature, pressure, vibration, and the like. Further, the items of monitoring targets may include use rates, use amounts, and the like of computer resources and network resources, such as a CPU (Central Processing Unit) use rate, a memory use rate, and disk access frequency. In the following description, the measurement values of a plurality of items of monitoring targets are referred to as monitoring data.

The risk determination device 100 is connected to the target system 500 via a network or the like. The risk determination device 100 determines risks of abnormalities detected in the target system 500.

The risk determination device 100 includes a monitoring data collection unit 111, a model generation unit 112, an abnormality detection unit 113, a classification unit 114, a determination unit 115, and an output unit 116. The risk determination device 100 further includes a monitoring data storage unit 121, a model storage unit 122, an abnormal pattern storage unit 123, a group storage unit 124, and a determination result storage unit 125.

The monitoring data collection unit 111 collects time-series monitoring data from the target system 500.

The monitoring data storage unit 121 stores the collected time-series monitoring data.

The model generation unit 112 generates a model representing a relationship among metrics based on the time-series monitoring data during a predetermined modeling period.

In the example embodiments of the present invention, the model generation unit 112 generates a correlation model 132 as a model. The correlation model 132 is a set of correlation functions (or conversion functions) each representing a correlation of each pair of metrics. The correlation function is a function that predicts, using values of one metric (input metric) of a pair of metrics at time t and before time t and values of the other metric (output metric) of the pair before time t, a value of the output metric at time t.

The model generation unit 112 generates a correlation model 132 based on time-series monitoring data during the predetermined modelling period, stored in the monitoring data storage unit 121, in the same manner as the operation management device of PTL 3. The model generation unit 112 may further calculate a weight for each pair of metrics based on a conversion error of a correlation function, and include a set of correlation functions whose weight is equal to or more than a predetermined threshold (effective correlation functions) in a correlation model 132.

FIG. 6 is a diagram illustrating an example of a correlation model 132 according to the example embodiments of the present invention. In FIG. 6, a correlation function $f_{x,y}$ indicates a correlation function between an input metric X and an output metric Y.

The model storage unit 122 stores the correlation model 132 generated by the model generation unit 112.

The abnormality detection unit 113 monitors an abnormality in the target system 500 during a monitoring period using the model generated by the model generation unit 112. Further, the abnormality detection unit 113 generates abnormal patterns 133 that each represent a relationship among metrics at a time of abnormality detection.

In the example embodiments of the present invention, the abnormality detection unit 113 detects an abnormality of the target system 500 by detecting correlation destruction of a correlation included in the correlation model 132. Further, the abnormality detection unit 113 generates, as an abnormal pattern 133, a vector (a correlation destruction vector) that has elements each representing whether correlation destruction is detected for respective pairs of metrics.

After the monitoring period, the classification unit 114 classifies the abnormal patterns 133 generated for respective abnormalities based on a similarity, and generates groups 134. Further, the classification unit 114 acquires, for each of the generated groups 134, an abnormality name representing an abnormality and an impact of the abnormality from a user or the like, and assigns them to the group 134.

The group storage unit 124 stores, for each of the groups 134, the number of abnormal patterns 133 classified to the group 134 (the number of occurrences), the abnormality name, the impact, and the like.

The determination unit 115 calculates likelihood of an abnormality for each of the groups 134 based on the number of abnormal patterns 133 classified to the group 134. Then, the determination unit 115 determines (identifies) a likelihood level for the calculated likelihood. Further, the determination unit 115 determines (identifies) an impact level for the impact of an abnormality for each of the groups 134.

The determination result storage unit 125 stores, for an abnormality of each of the groups 134, the likelihood level and the impact level determined by the determination unit 115.

The output unit 116 outputs a risk determination result 135 (likelihood level and impact level) on a risk matrix 136.

It is noted that the risk determination device 100 may be a computer that includes a CPU and a recording medium storing a program and operates under control of the program.

Figure 3:
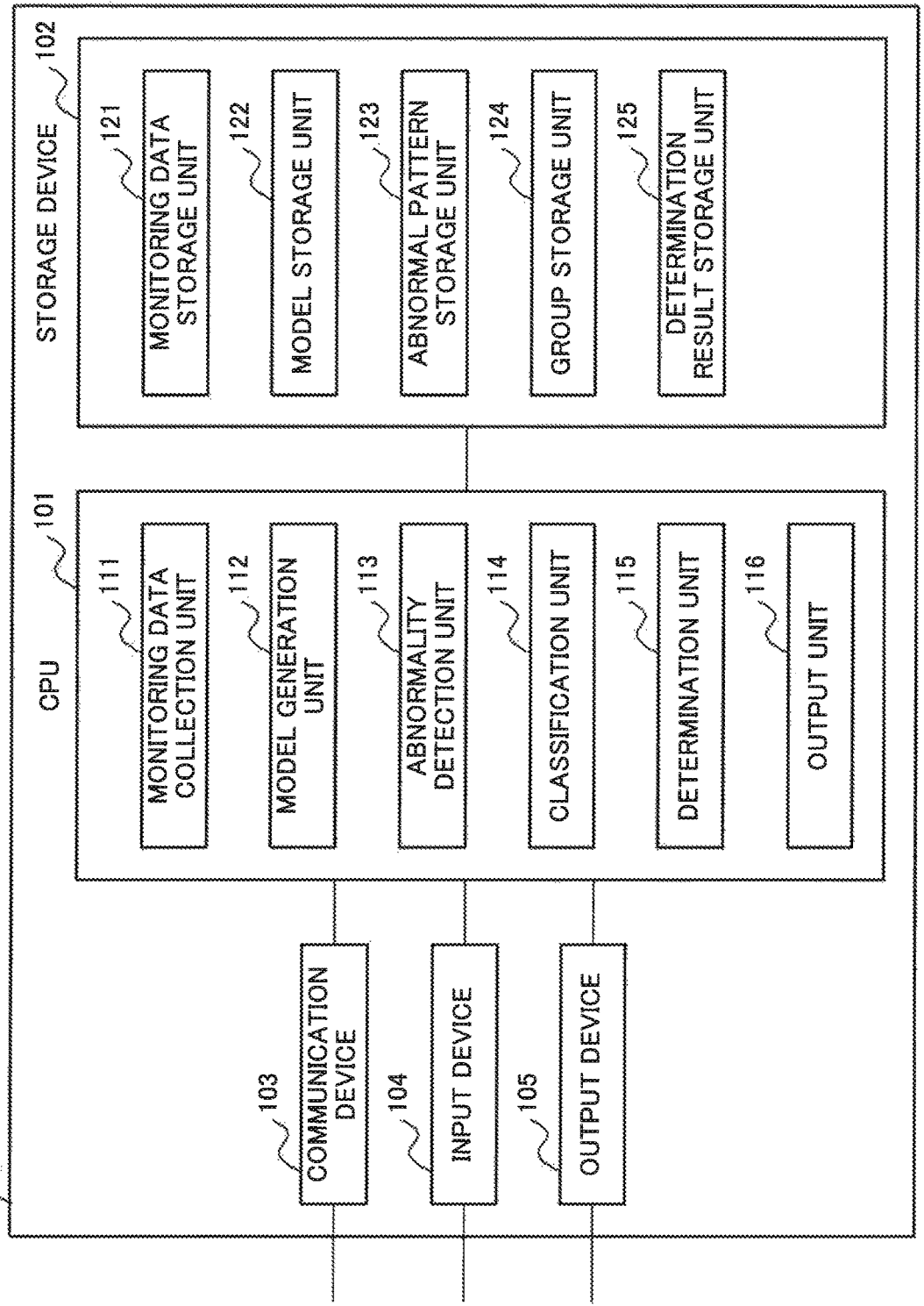
FIG. 3 is a block diagram illustrating a configuration of a risk determination device 100 implemented by a computer according to the first example embodiment of the present invention.

FIG. 3 is a block diagram illustrating a configuration of the risk determination device 100 implemented by a computer according to the first example embodiment of the present invention. The risk determination device 100 includes a CPU 101, a storage device 102 (a recording medium), such as a hard disk and a memory, a communication device 103 that communicates data with other devices, an input device 104, such as a keyboard, and an output device 105, such as a display.

The CPU 101 executes a computer program for implementing the functions of the monitoring data collection unit 111, model generation unit 112, abnormality detection unit 113, classification unit 114, determination unit 115, and output unit 116. The storage device 102 records information that is stored in the monitoring data storage unit 121, model storage unit 122, abnormal pattern storage unit 123, group storage unit 124, and determination result storage unit 125. The communication device 103 receives monitoring data from the target system 500. The input device 104 receives input of impacts of abnormalities from a user or the like. The output device 105 outputs (displays) a determination result screen 137 to the user or the like.

Alternatively, the components of the risk determination device 100 may be independent logic circuits. Alternatively, the components of the risk determination device 100 may be distributively arranged in a plurality of physical devices connected via a wired or wireless channel.

Next, the operation of the first example embodiment of the present invention will be described.

It is assumed that a correlation model 132 as in FIG. 6 is stored in the model storage unit 122.

Figure 4:
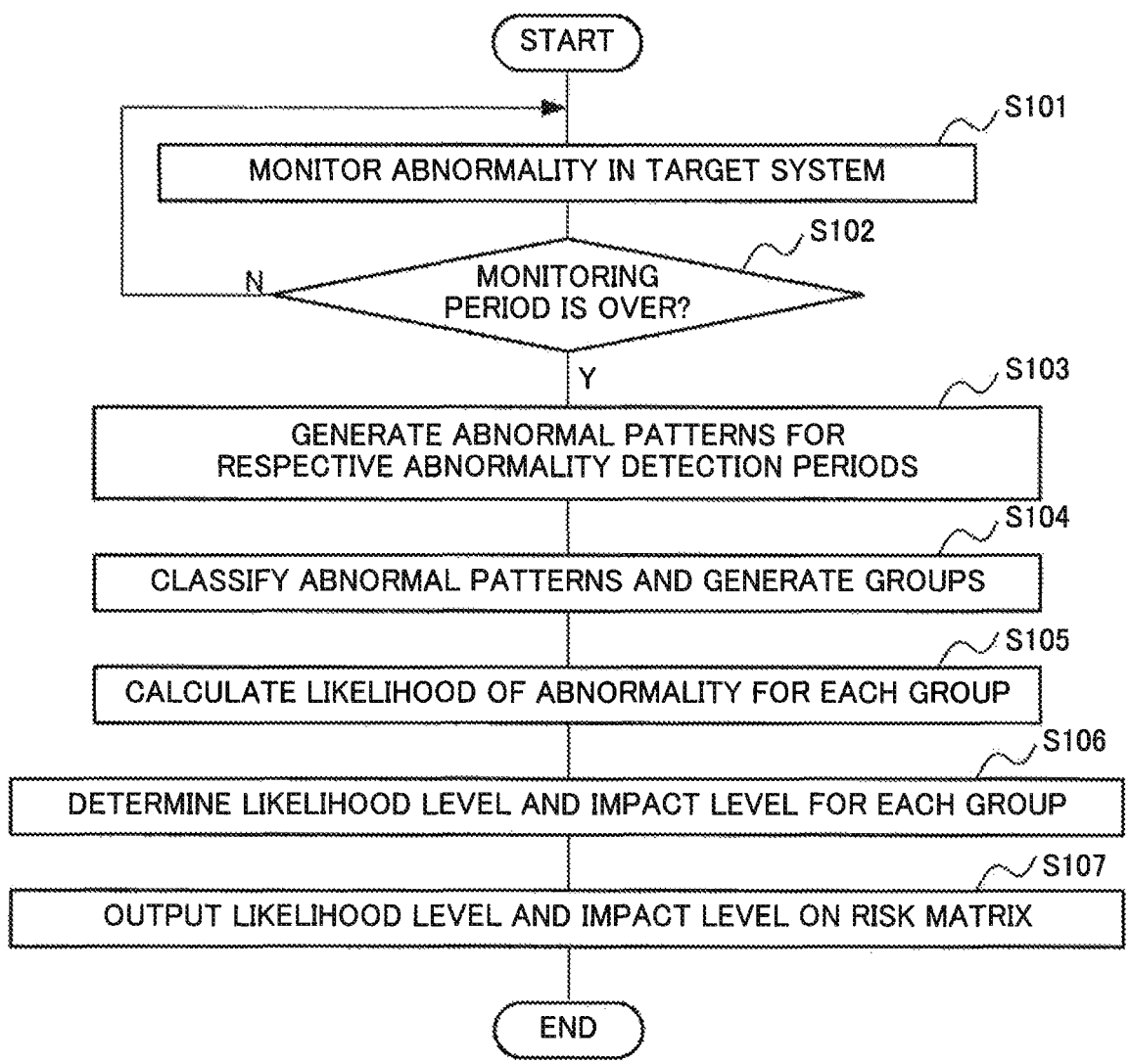
FIG. 4 is a flowchart illustrating processing of the risk determination device 100 according to the first example embodiment of the present invention.

FIG. 4 is a flowchart illustrating processing of the risk determination device 100 according to the first example embodiment of the present invention.

First, the abnormality detection unit 113 monitors an abnormality in the target system 500 for monitoring data that is measured at each time during a monitoring period using the correlation model 132 (step S101).

In this step, the abnormality detection unit 113 determines whether there is correlation destruction for each correlation included in the correlation model 132, for the monitoring data that is measured at each time, in the same way as the operation management device of PTL 3. The abnormality detection unit 113 calculates, for each pair or metrics, a difference between a predicted value of an output metric that is obtained by inputting a measurement value of an input metric to a correlation function and a measurement value of the output metric (a conversion error of the correlation function). Then, if the difference is equal to or more than a predetermined value, the abnormality detection unit 113 detects correlation destruction of a correlation of the pair. The abnormality detection unit 113 calculates, as an abnormality degree, the number of correlations on which correlation destruction is detected or magnitude of a conversion error for correlation destruction. Then, if the abnormality degree is equal to or more than a predetermined threshold, the abnormality detection unit 113 determines that the target system 500 has abnormality.

The abnormality detection unit 113 repeats the processing from step S101 during the monitoring period (step S102).

Figure 7:
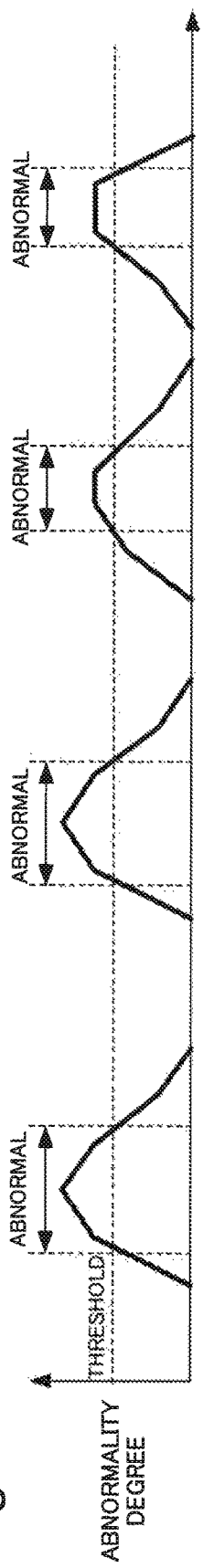
FIG. 7 is a diagram illustrating an example of an abnormality detection result according to the first example embodiment of the present invention.
Figure 7:
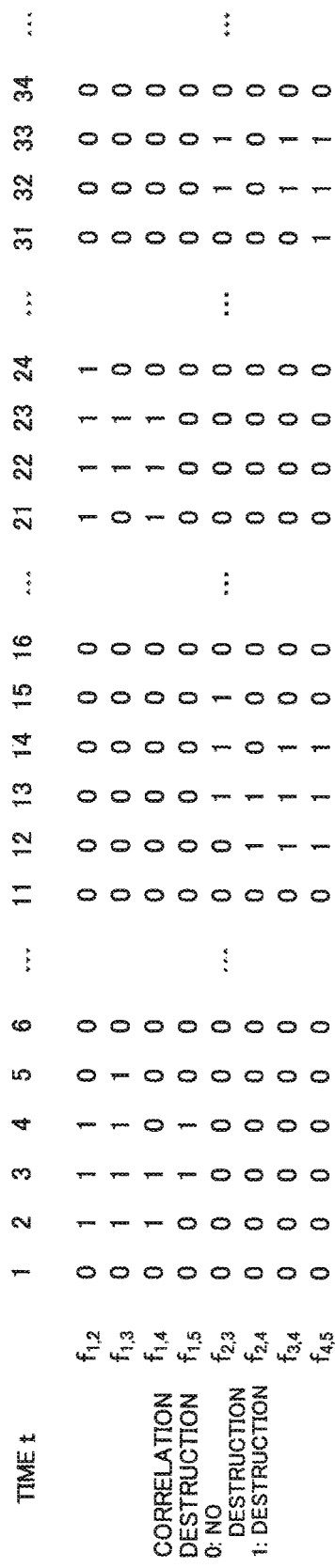
Figure 7:
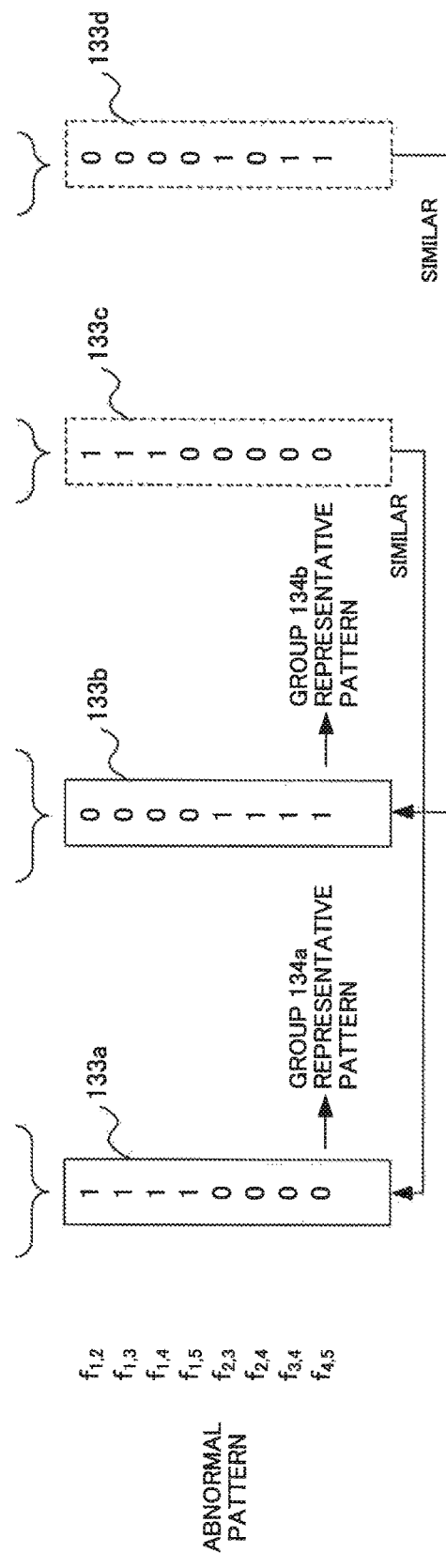

FIG. 7 is a diagram illustrating an example of an abnormality detection result according to the first example embodiment of the present invention.

For example, it is assumed that the number of correlation destructions is used as an abnormality degree and "3" is used as a threshold of the abnormality degree. In this case, the abnormality detection unit 113 detects correlation destruction in monitoring data that is measured at each time during the monitoring period (time t=1 . . . ), as illustrated in FIG. 7. The abnormality detection unit 113 detects abnormalities at time t=2 to 4, 12 to 14, 22 to 23, 32 to 33, . . . .

When the monitoring period is over, the abnormality detection unit 113 generates abnormal patterns 133 for respective periods during which an abnormality is continuously detected (abnormality detection periods) (step S103).

In this step, the abnormality detection unit 113 generates an abnormal pattern 133 by calculating a logical sum, a logical product, or an average of correlation destruction vectors during each of the abnormality detection periods.

For example, using a logical sum of correlation destruction vectors, the abnormality detection unit 113 generates abnormal patterns 133*a*, 133*b*, 133*c*, 133*d*, . . . , as illustrated in FIG. 7 for abnormality detection periods (time t=2 to 4, 12 to 14, 22 to 23, 32 to 33, . . . ).

The classification unit 114 classifies the abnormal patterns 133 generated for respective abnormality detection periods during the monitoring period, and generates groups 134 (step S104).

In this step, the classification unit 114 generates groups 134, for example, by sequentially determining a similarity between the abnormal patterns 133.

Figure 5:
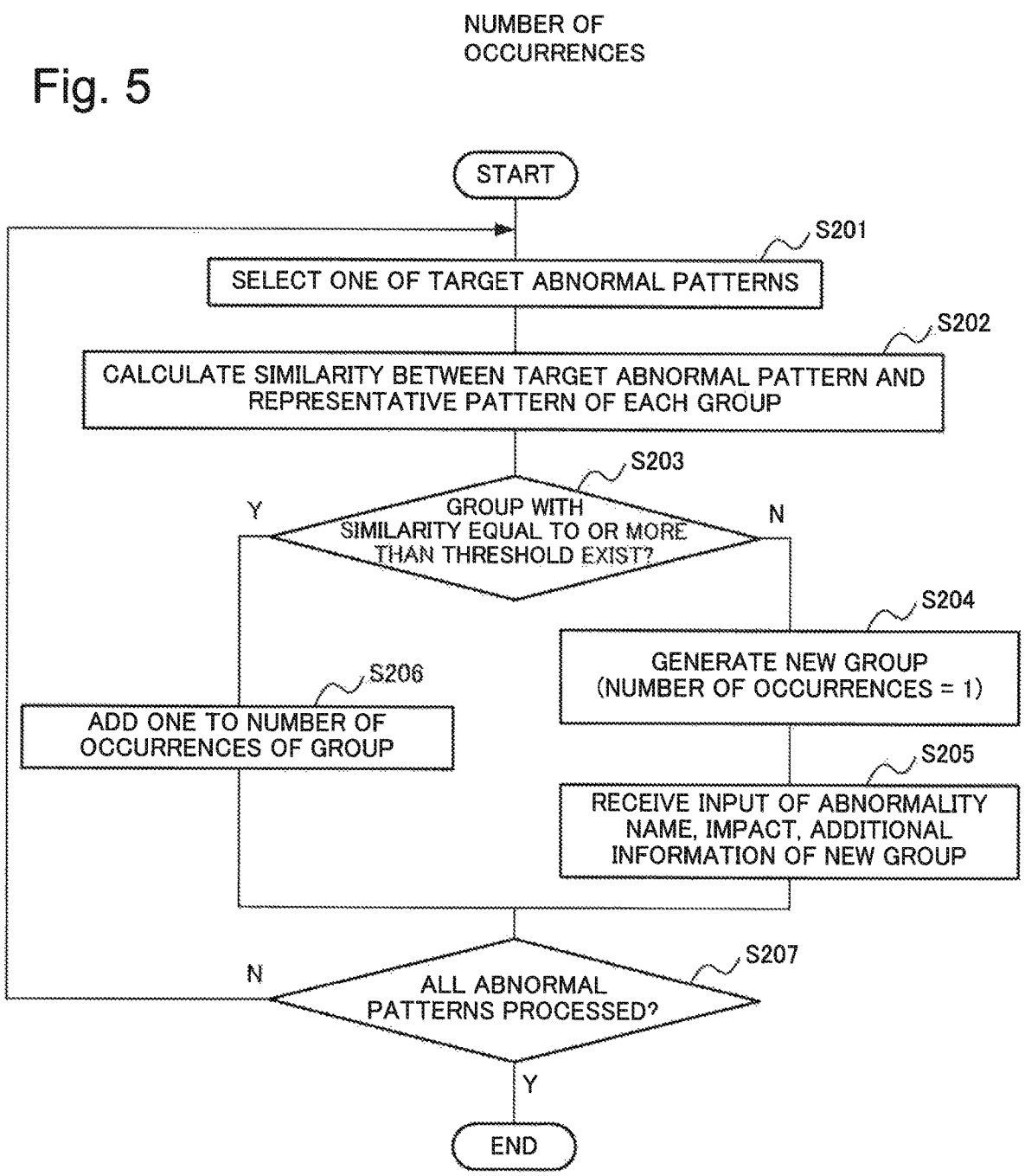
FIG. 5 is a flowchart illustrating details of group generation process (step S104) according to the first example embodiment of the present invention.

FIG. 5 is a flowchart illustrating details of the group generation process (step S104) according to the first example embodiment of the present invention.

The classification unit 114 selects one of the abnormal patterns 133 (target abnormal pattern 133) in the order of detection (step S201).

The classification unit 114 calculates a similarity between the target abnormal pattern 133 and a representative pattern of each of generated groups 134 (step S202). As the similarity, for example, a distance between abnormal patterns 133 (correlation destruction vectors) is used.

If there is no group 134 with which the similarity is equal to or more than a predetermined threshold (step S203/N), the classification unit 114 generates a new group 134 (step S204). In this step, the target abnormal pattern 133 is set as a representative pattern of the new group 134, and one is set as the number of abnormal patterns 133 that is classified into the new group 134 (the number of occurrences).

The classification unit 114 receives input of an abnormality name, an impact, and additional information relating to the new group 134 from a user or the like (step S205). The user or the like determines, based on the abnormal pattern 133 and other information relating to conditions of the target system 500, the cause and the impact of the abnormality, and inputs the cause and the impact together with additional information, such as the cause, phenomenon, counter measure and the like relating to the abnormality. As for the impact, for example, costs for addressing the abnormality, time for stopping the target system 500 for addressing the abnormality (impacting time), and the like are set.

Figure 8:
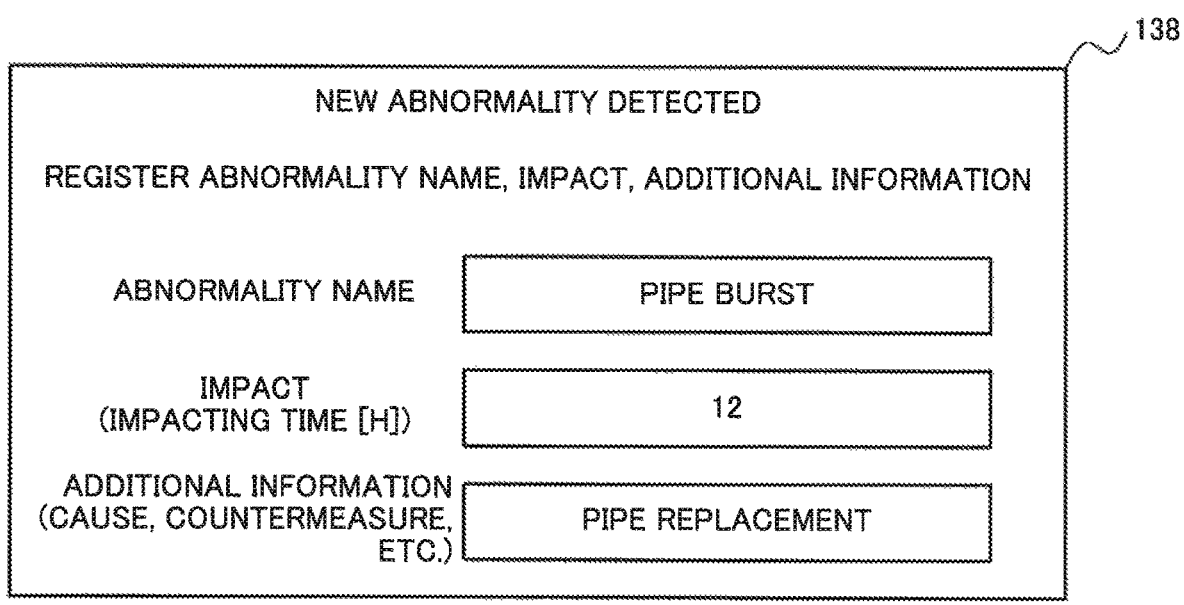
FIG. 8 is a diagram illustrating an example of an abnormal information input screen 138 according to the first example embodiment of the present invention.

FIG. 8 is a diagram illustrating an example of an abnormal information input screen 138 according to the first example embodiment of the present invention. FIG. 9 is a diagram illustrating an example of information stored in the group storage unit 124 according to the first example embodiment of the present invention.

For example, in FIG. 7, the classification unit 114 generates a group 134*a* where the abnormal pattern 133*a* is set as a representative pattern. The classification unit 114 receives, with an abnormal information input screen 138 as illustrated in FIG. 8, input of an abnormality name, an impact, and additional information of the group 134*a* from a user or the like. Then, the classification unit 114 stores the abnormality name, the impact, the additional information, and the representative pattern (abnormal pattern 133*a*) of the group 134*a* in the group storage unit 124, as illustrated in FIG. 9.

On the other hand, if there is a group 134 with which the similarity is equal to or more than a predetermined threshold (step S203/Y), the classification unit 114 classifies the target abnormal pattern 133 into the group 134 and adds one to the number of occurrences of the group 134 (step S206).

For example, in FIG. 7, if similarity between the abnormal pattern 133*c* and the representative pattern (abnormal pattern 133*a*) of the group 134*a* is equal to or more than a threshold, the classification unit 114 classifies the abnormal pattern 133*c* into the group 134*a*. Then, the classification unit 114 adds one to the number of occurrences of the group 134*a*.

The classification unit 114 repeats the processing from step S201 for the abnormal patterns 133 of all the abnormality detection periods during the monitoring period (step S207).

As the result, for example, groups 134*a* to 134*c*, as illustrated in FIG. 9, are generated.

It is noted that, instead of receiving input of an abnormality name and an impact from a user or the like, the classification unit 114 may use a cause and an impact of the abnormality that are determined by an analysis unit, not illustrated, based on the abnormal pattern 133 or other information.

Further, when the target abnormal pattern 133 is classified to a group 134, the classification unit 114 may update a representative pattern of the group 134. In such a case, the classification unit 114 updates the representative pattern, for example, by setting an average vector of the abnormal patterns 133 that are classified to the group 134 as a new representative pattern.

Alternatively, the classification unit 114 may use a method that is different from the method illustrated in FIG. 5 to generate groups 134, as long as the abnormal patterns 133 are classified. For example, the classification unit 114 may generate K number of groups 134 by classifying the abnormal patterns 133 generated for the monitoring period with k-means clustering. The classification unit 114 may generate groups 134 by combining several clustering methods.

Next, the determination unit 115 calculates likelihood of an abnormality for each of the groups 134 (step S105). In this step, the determination unit 115 calculates, as the likelihood, frequency of an abnormality that is a value obtained by dividing the number of occurrences of an abnormality for each group 134 by the length of the monitoring period (the number of occurrences of an abnormality per unit time).

FIG. 10 is a diagram illustrating an example of a likelihood calculation result according to the first example embodiment of the present invention.

For example, for the groups 134*a* to 134*c* generated for a monitoring period of "two months" as illustrated in FIG. 9, the determination unit 115 calculates likelihood for each of the groups 134*a* to 134*c* as illustrated in FIG. 10.

The determination unit 115 determines (identifies) a likelihood level and an impact level of an abnormality for each group 134 in the risk matrix 136 (step S106). The determination unit 115 stores the likelihood level and the impact level of the abnormality determined for each group 134, as a risk determination result 135, in the determination result storage unit 125.

The risk matrix 136 is a matrix that indicates each combination of one of a predetermined number of likelihood levels and one of a predetermined number of abnormality levels. The likelihood level corresponding to a value of likelihood and the impact level corresponding to a value of an impact are respectively defined in a predetermined likelihood conversion table and an impact conversion table. The determination unit 115 converts the likelihood and the impact of the abnormality for each of the groups 134 to the likelihood level and the impact level on the risk matrix 136, respectively, in accordance with the likelihood conversion table and impact conversion table.

Figures 12, 13:
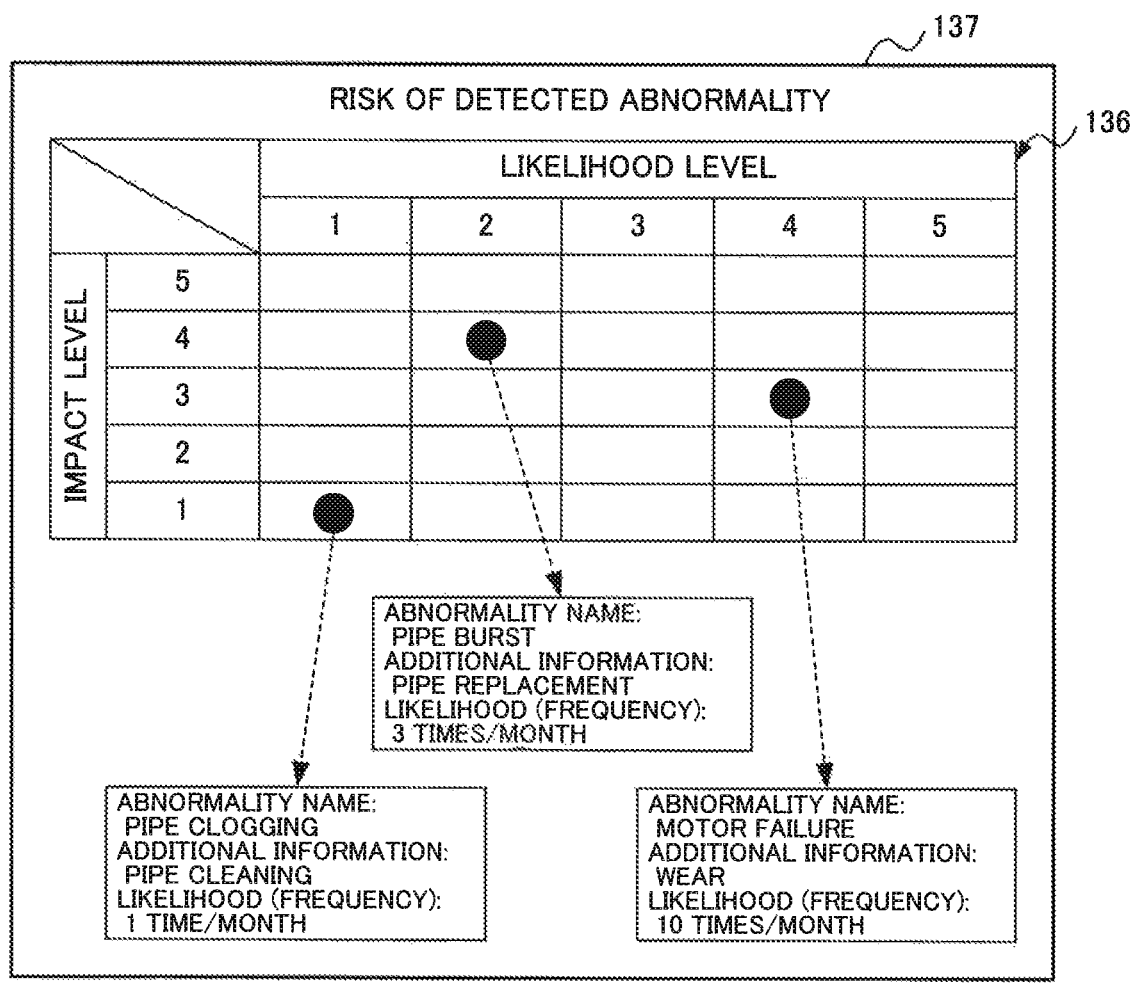
FIG. 12 is a diagram illustrating an example of a risk determination result 135 according to the first example embodiment of the present invention.
FIG. 13 is a diagram illustrating an example of a determination result screen 137 according to the first example embodiment of the present invention.

FIG. 11 is a diagram illustrating an example of a likelihood conversion table and an impact conversion table according to the first example embodiment of the present invention. FIG. 12 is a diagram illustrating an example of a risk determination result 135 according to the first example embodiment of the present invention.

For example, the determination unit 115 converts the likelihood of FIG. 10 and the impacts of FIG. 9 for the groups 134a to 134c to the likelihood levels and impact levels, as illustrated in FIG. 12, in accordance with the likelihood conversion table and the impact conversion table of FIG. 11.

Next, the output unit 116 outputs the likelihood level and the impact level of the abnormality for each of the groups 134 on the risk matrix 136 (step S107).

FIG. 13 is a diagram illustrating an example of a determination result screen 137 according to the first example embodiment of the present invention.

In the example of FIG. 13, the determination result screen 137 includes a risk matrix 136. The risk matrix 136 indicates a mark at a position corresponding to likelihood level and an impact level of an abnormality for each of the groups 134. Further, information on the abnormality, such as an abnormality name, additional information, and likelihood, for the corresponding group 134, is displayed in association with the mark.

For example, the output unit 116 generates a determination result screen 137 of FIG. 13 for the groups 134a to 134c based on the risk determination result 135 of FIG. 12, and outputs (displays) the determination result screen to the user or the like.

It is noted that the information on an abnormality for a group 134 may be displayed when a mark corresponding to the group 134 is specified on the risk matrix 136 by a mouse or the like. Further, the information on the abnormality may be displayed at a position corresponding to the likelihood level and impact level of the abnormality for each of the groups 134 on the risk matrix 136.

This completes the operation of the first example embodiment of the present invention.

It is noted that a correlation model 132 is used as a model in the first example embodiment of the present invention. However, without limitation to this model, other models based on methods commonly known in the field of statistical processing may be used, as long as the models represent a statistical relationship among metrics. For example, a linear, non-linear, or probability distribution model, such as an autoregressive model and a logistic regression model, may be used as a model.

In addition, a vector (a correlation destruction vector) that has elements each representing whether correlation destruction is detected in respective correlations is used as an abnormal pattern 133 in the first example embodiment of the present invention. However, without limitation to this vector, other information may be used as an abnormal pattern 133, as long as the information represents states of correlations upon abnormality occurrence. For example, as described in PTL 4, the distribution of conversion errors for respective correlations, during an abnormality detection period, may be used as an abnormal pattern 133. Alternatively, as described in PTL 5, the distribution of the number of detections of correlation destruction for respective correlations, during an abnormality detection period, may be used as an abnormal pattern 133.

Further, in the first example embodiment of the present invention, the number of occurrences of abnormalities per unit time (frequency) is used as the likelihood of the abnormality. However, without limitation to this, a probability of an abnormality (for example, the number of occurrences of abnormalities in each group 134 out of the number of occurrences of abnormalities in all the groups 134) may be calculated as long as it represents the likelihood of the abnormality.

Figure 1:
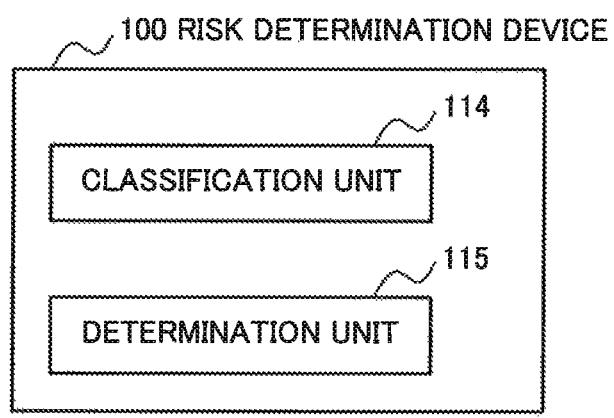
FIG. 1 is a block diagram illustrating a characteristic configuration of a first example embodiment of the present invention.

Next, a characteristic configuration of the first example embodiment of the present invention will be disclosed. FIG. 1 is a block diagram illustrating the characteristic configuration of the first example embodiment of the present invention.

The risk determination device 100 (information processing device) includes a classification unit 114 and a determination unit 115. The classification unit 114 classifies abnormal patterns 133, each representing a relationship among metrics at a time of abnormality detection in a system, into groups 134 based on a similarity between the abnormal patterns. The determination unit 115 determines, based on the number of abnormal patterns 133 classified into each of the groups 134, likelihood of an abnormality of the corresponding group 134.

Next, an advantageous effect of the first example embodiment of the present invention will be described.

According to the first example embodiment of the present invention, accuracy of risks defined for abnormalities that might occur in a system can be improved. This is because the classification unit 114 classifies abnormal patterns, each representing a relationship among metrics at a time of abnormality detection in a system, into groups, and the determination unit 115 determines, based on the number of abnormal patterns classified into each of the groups, likelihood of an abnormality of the corresponding group 134. In this way, since there is no need for a user to classify and determine the likelihood, accuracy of classification and likelihood of an abnormality can be improved.

For example, if there are long-term deterioration and short-term deterioration as causes of the same failure (phenomenon) in a plant system, abnormal patterns 133 are generated for respective causes and these causes are classified into different groups 134. Then, likelihood levels are determined for the respective causes. A user can design an appropriate maintenance plan in accordance with a risk involved in each cause.

Second Example Embodiment

Next, a second example embodiment of the present invention will be described.

The second example embodiment of the present invention is different from the first example embodiment of the present invention in that a risk is determined each time an abnormality is detected, during a monitoring period.

First, a configuration of the second example embodiment of the present invention will be described. The block diagram illustrating the configuration of the risk determination device 100 in the second example embodiment of the present invention is the same as the one of the first example embodiment of the present invention (FIG. 2).

The classification unit 114 classifies, each time an abnormality is detected during a monitoring period, an abnormal pattern 133 generated for the abnormality.

The determination unit 115 determines (identifies) a likelihood level and an impact level of the abnormality for the group 134 into which the abnormal pattern 133 is classified.

The output unit 116 outputs the likelihood level and the impact level of the abnormality on the risk matrix 136.

Figure 14:
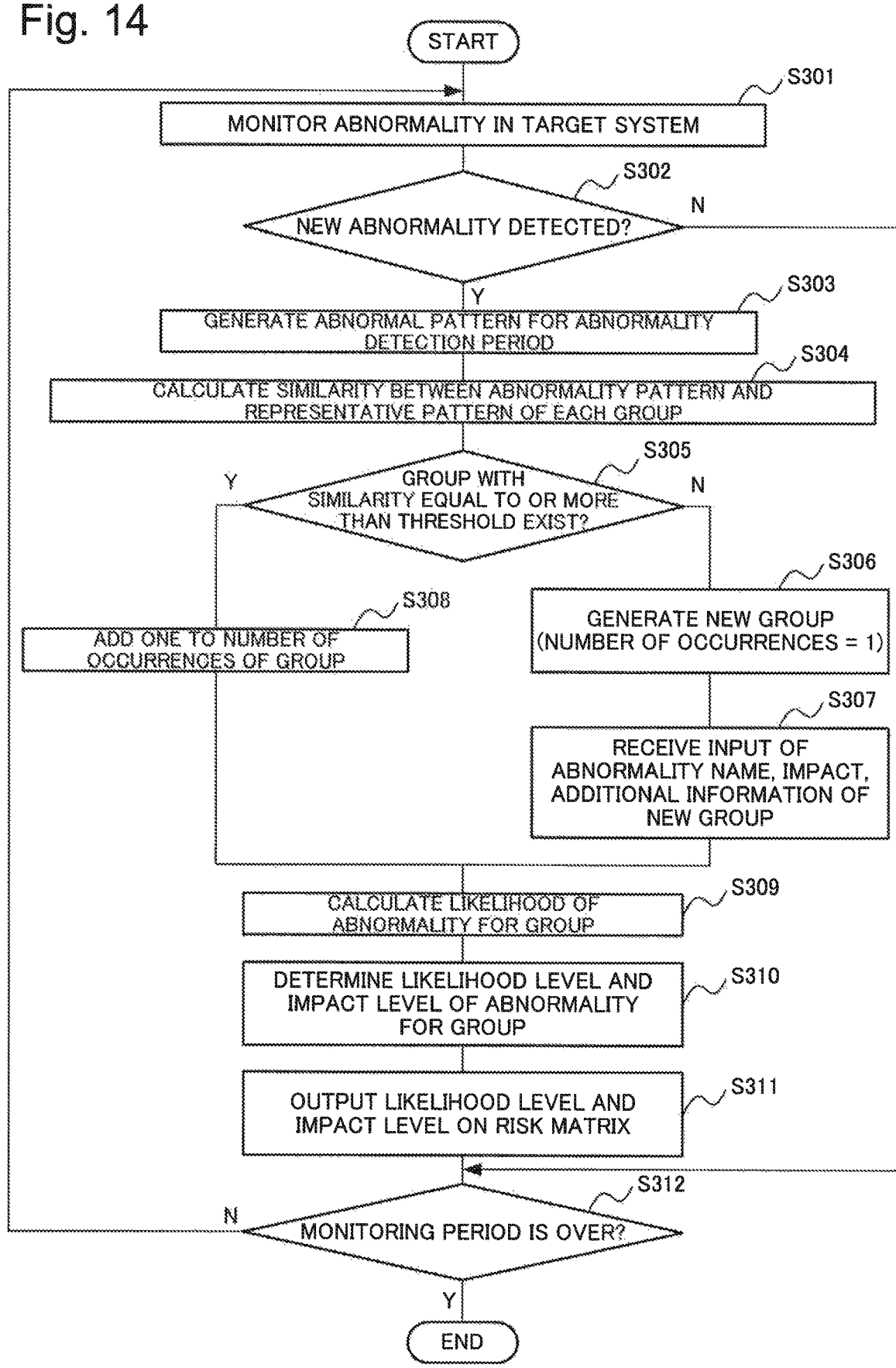
FIG. 14 is a flowchart illustrating processing of the risk determination device 100 according to a second example embodiment of the present invention.

FIG. 14 is a flowchart illustrating processing of the risk determination device 100 according to the second example embodiment of the present invention.

First, in the same way as the above-described step S101, the abnormality detection unit 113 monitors an abnormality in the target system 500 for monitoring data that is measured at each time during a monitoring period using a correlation model 132 (step S301).

If an abnormality is detected in the target system 500 (step S302/Y), the abnormality detection unit 113 generates an abnormal pattern 133 for an abnormality detection period in the same way as step S103, for example, when the abnormality detection period is over (step S303).

The classification unit 114 calculates a similarity between the generated abnormal pattern 133 and a representative pattern of each of generated groups 134 in the same way as step S202 (step S304).

If there is no group 134 with which the similarity is equal to or more than a predetermined threshold (step S305/N), the classification unit 114 generates a new group 134 in the same manner as step S204 (step S306). The classification unit 114 receives input of an abnormality name, an impact, and additional information relating to the new group 134 from a user or the like in the same manner as step S205 (step S307).

On the other hand, if there is a group 134 with which the similarity is equal to or more than a predetermined threshold (step S305/Y), the classification unit 114 classifies the abnormal pattern 133 into the group 134 and adds one to the number of occurrences of the group 134 in the same manner as step S206 (step S308).

The determination unit 115 calculates likelihood of an abnormality of the group 134 to which the abnormal pattern 133 is classified, in the same way as step S105 (step S309). Here, the determination unit 115 calculates the likelihood, for example, based on the number of occurrences until that time point and the length of the monitoring period until that time point. The determination unit 115 determines a likelihood level and an impact level of the abnormality of the group 134 into which the abnormal pattern 133 is classified, in the same manner as step S106 (step S310).

Next, the output unit 116 outputs the likelihood level and the impact level of the abnormality of the group 134 to which the abnormal pattern 133 is classified, on the risk matrix 136 (step S311).

Thereafter, during the monitoring period, the processing of steps S301 to S311 is repeated (step S312).

Figure 16:
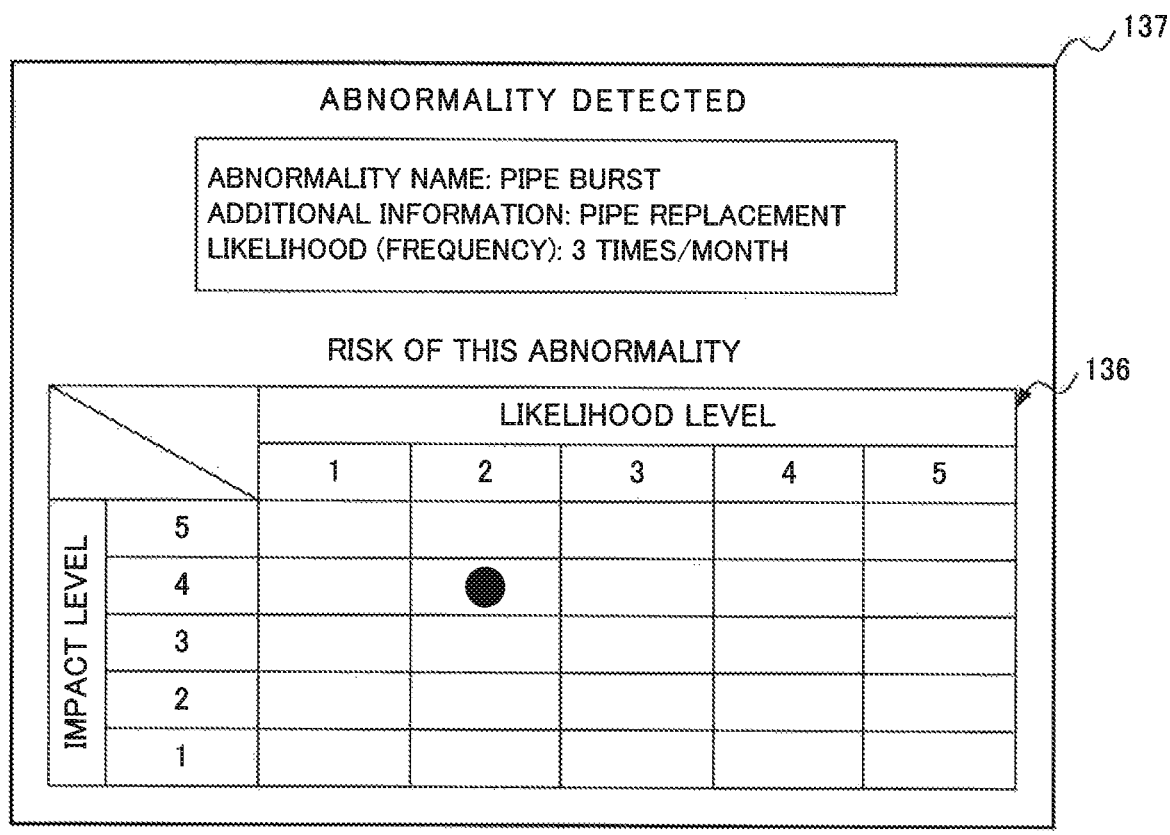
FIG. 16 is a diagram illustrating another example of the determination result screen 137 according to the second example embodiment of the present invention.

FIGS. 15 and 16 are diagrams illustrating examples of determination result screens 137 according to the second example embodiment of the present invention.

For example, the abnormality detection unit 113 generates a new abnormal pattern 133a for an abnormality at time t=2 to 4 in FIG. 7. The classification unit 114 generates a new group 134a for an abnormal pattern 133a and receives input of an abnormality name, an impact, and additional information of the abnormality of the group 134a from a user or the like. The determination unit 115 calculates likelihood of the abnormality of the group 134a, and determines a likelihood level and an impact level of the abnormality. Then, the output unit 116 outputs, for example, a determination result screen 137 as illustrated in FIG. 15.

Thereafter, if a similarity between the abnormal pattern 133 of an abnormality detected at certain time and the representative pattern of the group 134a is equal to or more than a threshold, the classification unit 114 classifies the abnormal pattern 133 into the group 134a, and adds one to the number of occurrences. The determination unit 115 calculates the likelihood of the abnormality of the group 134a, and determines the likelihood level and the impact level of the abnormality. Then, the output unit 116 outputs, for example, a determination result screen 137 as illustrated in FIG. 16.

This completes the operation of the second example embodiment of the present invention.

Next, an advantageous effect of the second example embodiment of the present invention will be described.

According to the second example embodiment of the present invention, risks of abnormalities that occur during operation of a system can be easily obtained. This is because the classification unit 114 classifies the abnormal pattern of a newly detected abnormality, and the output unit 116 outputs a likelihood level and an impact level of the abnormality of a group into which the abnormal pattern is classified.

Third Example Embodiment

The third example embodiment of the present invention will be described.

The third example embodiment of the present invention is different from the first or second example embodiment of the present invention in that a change in a likelihood level of an abnormality is reported when the likelihood level is changed by a newly detected abnormality.

In the third example embodiment, it is assumed that risks are determined for each monitoring period, in the same manner as the first example embodiment of the present invention. In this case, the classification unit 114 classifies abnormalities that are detected during a certain monitoring period (first monitoring period). The determination unit 115 determines a likelihood level and an impact level of an abnormality of each of groups 134 and generates a risk determination result 135. The output unit 116 outputs a risk matrix 136.

For example, the output unit 116 outputs a risk matrix 136 as illustrated in FIG. 13 for the risk determination result 135 of FIG. 12.

Next, the classification unit 114 initializes the number of occurrences of each of the groups 134, and classifies abnormalities detected in the following monitoring period (second monitoring period). The determination unit 115 re-determines the likelihood level of the abnormality of each of the groups 134 based on the new number of occurrences of each of the groups 134, and updates the risk determination result 135. In this case, the determination unit 115 compares the risk determination result 135 for the first monitoring period and the risk determination result 135 for the second monitoring period. If there is a group 134 whose likelihood level is updated between the first monitoring period and the second monitoring period, the output unit 116 reports that the likelihood level of the abnormality of the group 134 is changed on the risk matrix 136.

Figure 17:
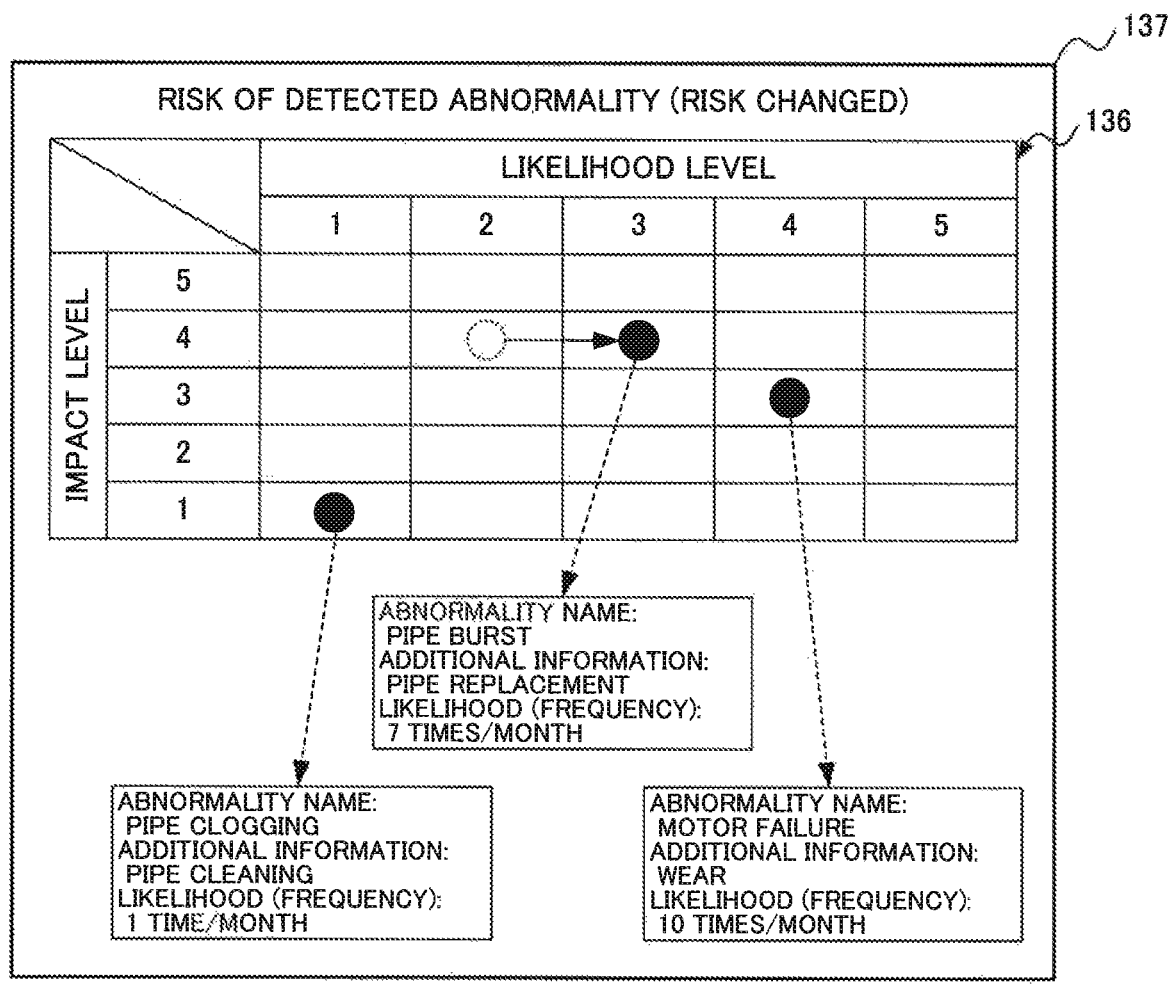
FIG. 17 is a diagram illustrating an example of a determination result screen 137 according to a third example embodiment of the present invention.

FIG. 17 is a diagram illustrating an example of a determination result screen 137 according to the third example embodiment of the present invention.

For example, if the number of occurrences during the second monitoring period is larger than that of the first monitoring period for the group 134a and the likelihood level during the second monitoring period is larger than that of the first monitoring period, the output unit 116 outputs the determination result screen 137 as illustrated in FIG. 17.

It is noted that, in the case where risk determination is performed each time an abnormality is detected, in the same manner as the second example embodiment of the present invention, the determination unit 115 also determines whether the likelihood level of the group 134 is changed upon determination of the likelihood level into which the abnormal pattern 133 is classified. Then, if the likelihood level is changed, the output unit 116 reports that the likelihood level of the abnormality of the group 134 is changed on the risk matrix 136.

Figure 18:
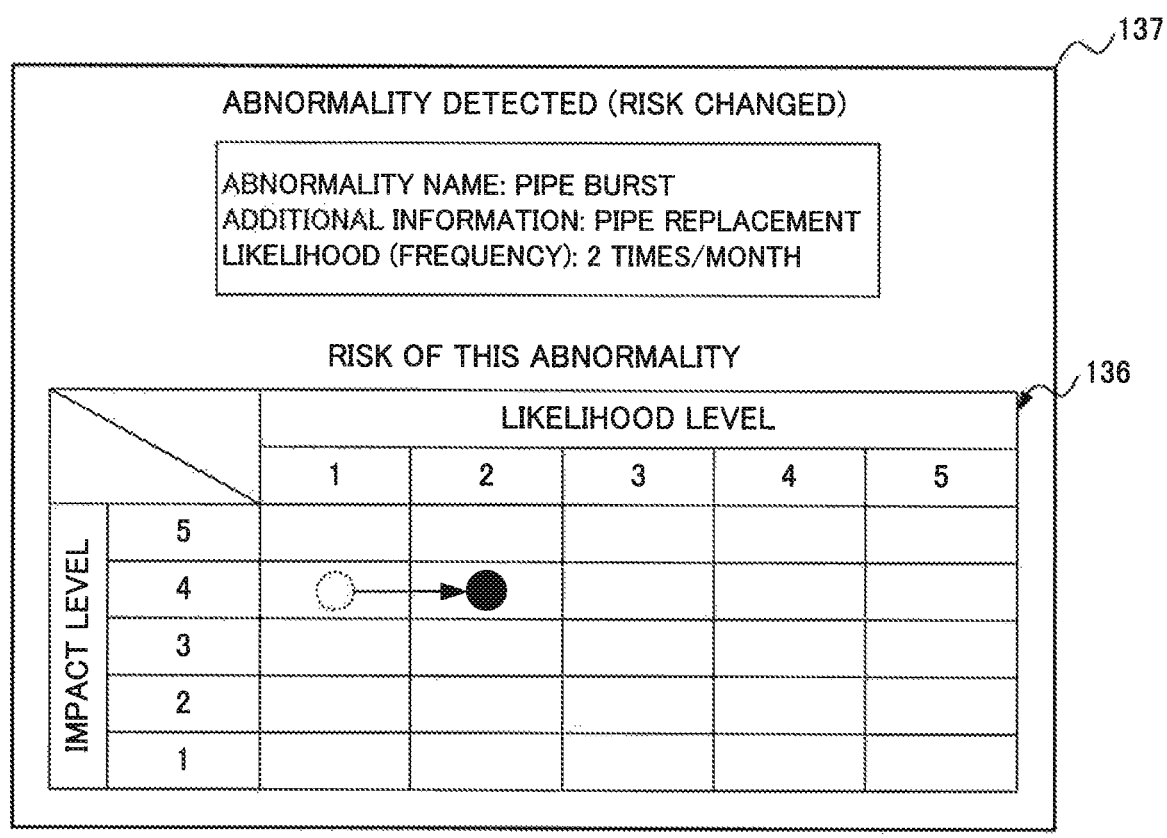
FIG. 18 is a diagram illustrating another example of the determination result screen 137 according to the third example embodiment of the present invention.

FIG. 18 is a diagram illustrating another example of a determination result screen 137 according to the third example embodiment of the present invention.

For example, if the likelihood level of the group 134a into which the abnormal pattern 133 is classified, is changed, the output unit 116 outputs the determination result screen 137 as illustrated in FIG. 18.

Next, an advantageous effect of the third example embodiment of the present invention will be described.

According to the third example embodiment of the present invention, a change in risks of abnormalities that occur in the system can be easily obtained. This is because the classification unit 114 classifies an abnormal pattern of a newly detected abnormality, and the output unit 116 reports a change of a likelihood level of an abnormality of the group into which the abnormality is classified when the likelihood level is changed by the classification of the abnormal pattern.

While the present invention has been particularly shown and described with reference to the example embodiments thereof, the present invention is not limited to the embodiments. It will be understood by those of ordinary skill in the art that various changes in form and details may be made therein without departing from the spirit and scope of the present invention as defined by the claims.

REFERENCE SIGNS LIST

1 Analysis system
100 Risk determination device
101 CPU
102 Storage device
103 Communication device
104 Input device
105 Output device
111 Monitoring data collection unit
112 Model generation unit
113 Abnormality detection unit
114 Classification unit
115 Determination unit
116 Output unit
121 Monitoring data storage unit
122 Model storage unit
123 Abnormal pattern storage unit
124 Group storage unit
125 Determination result storage unit
132 Correlation model
133 Abnormal pattern
134 Group
135 Risk determination result
136 Risk matrix
137 Determination result screen
138 Abnormal information input screen
500 Target system
501 Sensor

The invention claimed is:

1. An information processing device comprising:
a memory storing instructions; and
one or more processors configured to execute the instructions to:
classify abnormal patterns, each representing a relationship among metrics at a time of abnormality detection in a system, into groups based on a similarity between the abnormal patterns;
determine, based on a number of abnormal patterns classified into each of the groups, a likelihood of an abnormality of the corresponding group; and
display, for each of the groups, a combination of the likelihood of the abnormality of the group and an impact that is set for the abnormality of the group, at a position corresponding to the combination of the likelihood and the impact of the abnormality on a risk matrix that indicates a combination of a likelihood and an impact.

2. The information processing device according to claim 1, wherein
an abnormal pattern of an abnormality that is newly detected in the system is classified, and
a combination of likelihood and an impact of a group into which the abnormal pattern is classified is outputted.

3. The information processing device according to claim 1, wherein
an abnormal pattern of an abnormality that is newly detected in the system is classified, and
a change in likelihood of an abnormality of a group into which the abnormal pattern is classified is reported when the likelihood is changed by the classification of the abnormal pattern.

4. An information processing system comprising:
sensors that measure values of metrics in the system; and
the information processing device according to claim 1.

5. The information processing device according to claim 1, wherein
each of the abnormal patterns represents a pattern of correlation destruction between metrics at a time of abnormality detection in the system.

6. A plant system comprising:
a plant that performs predetermined processing;
sensors that measure values of metrics in the plant; and
the information processing device according to claim 1, wherein
in the information processing device, likelihood of an abnormality in the plant is determined, using the plant as the system.

7. An information processing method comprising:
classifying abnormal patterns, each representing a relationship among metrics at a time of abnormality detection in a system, into groups based on a similarity between the abnormal patterns;
determining, based on a number of abnormal patterns classified into each of the groups, a likelihood of an abnormality of the corresponding group; and
displaying, for each of the groups, a combination of the likelihood of the abnormality of the group and an impact that is set for the abnormality of the group, at a position corresponding to the combination of the likelihood and the impact of the abnormality on a risk matrix that indicates a combination of a likelihood and an impact.

8. A non-transitory computer readable storage medium recording thereon a program causing a computer to perform a method comprising:

classifying abnormal patterns, each representing a relationship among metrics at a time of abnormality detection in a system, into groups based on a similarity between the abnormal patterns;

determining, based on a number of abnormal patterns classified into each of the groups, a likelihood of an abnormality of the corresponding group; and displaying, for each of the groups, a combination of the likelihood of the abnormality of the group and an impact that is set for the abnormality of the group, at a position corresponding to the combination of the likelihood and the impact of the abnormality on a risk matrix that indicates a combination of a likelihood and an impact.

* * * * *